United States Patent [19]
Zavrel

[11] Patent Number: 5,812,930
[45] Date of Patent: Sep. 22, 1998

[54] INFORMATION HANDLING SYSTEMS WITH BROADBAND AND NARROWBAND COMMUNICATION CHANNELS BETWEEN REPOSITORY AND DISPLAY SYSTEMS

[75] Inventor: Robert Joseph Zavrel, Chapel Hill, N.C.

[73] Assignee: International Business Machines Corp., Armonk, N.Y.

[21] Appl. No.: 678,017

[22] Filed: Jul. 10, 1996

[51] Int. Cl.[6] ........................................ H04H 1/00
[52] U.S. Cl. .................... 455/5.1; 375/200; 370/490; 370/493
[58] Field of Search ................ 455/445, 66, 454, 455/466, 434, 503, 3.1, 3.2, 4.1, 4.2, 6.3, 5.1; 370/493, 490, 494–495, 486; 375/200, 202, 205, 206; 348/7, 10

[56] References Cited

U.S. PATENT DOCUMENTS

| | | | |
|---|---|---|---|
| 4,064,490 | 12/1977 | Nagel | 364/200 |
| 4,885,747 | 12/1989 | Foglia | 370/123 |
| 4,928,177 | 5/1990 | Martinez | 358/142 |
| 5,068,916 | 11/1991 | Harrison et al. | 455/39 |
| 5,159,592 | 10/1992 | Perkins | 370/85.7 |
| 5,245,429 | 9/1993 | Virginio et al. | 358/142 |
| 5,247,347 | 9/1993 | Literal et al. | 358/85 |
| 5,260,989 | 11/1993 | Jenness et al. | 379/59 |
| 5,321,542 | 6/1994 | Freitas et al. | 359/172 |
| 5,347,304 | 9/1994 | Moura et al. | 348/12 |
| 5,375,144 | 12/1994 | Ehsani et al. | 375/38.7 |
| 5,394,433 | 2/1995 | Bantz et al. | 375/202 |
| 5,410,343 | 4/1995 | Coddington et al. | 348/7 |
| 5,448,569 | 9/1995 | Huang et al. | 370/95.1 |
| 5,483,277 | 1/1996 | Granger | 348/6 |
| 5,586,121 | 12/1996 | Moura et al. | 370/404 |
| 5,594,491 | 1/1997 | Hodge et al. | 348/7 |
| 5,600,707 | 2/1997 | Miller | 455/434 |
| 5,659,353 | 8/1997 | Kostreski et al. | 348/21 |

FOREIGN PATENT DOCUMENTS

| | | | |
|---|---|---|---|
| 0208501 | 1/1998 | European Pat. Off. | H04N 7/08 |
| 3207022 | 9/1983 | Germany | H04H 1/00 |
| 2184327 | 6/1987 | United Kingdom | H04M 11/06 |
| 2285564 | 7/1995 | United Kingdom | H04N 7/16 |
| 2307381 | 5/1997 | United Kingdom | H04L 12/66 |
| 38002 | 11/1996 | WIPO | H04N 7/173 |

*Primary Examiner*—Nguyen Vo
*Assistant Examiner*—Lee Nguyen
*Attorney, Agent, or Firm*—Daniel E. McConnell

[57] ABSTRACT

A bidirectional or unidirectional information handling system for data exchange and distribution. The system includes a data repository system and a data display system. The systems are linked for data exchange by a broadband channel for unidirectional high data flow rates and, in some embodiments, by a narrowband channel for bidirectional lower data flow rates. The display system may take a number of forms, including personal communications assistants, desktop personal computers, and set top boxes. The data communication channels may be defined by a number of different protocols and bandwidth segments and may be wireline or wireless.

44 Claims, 9 Drawing Sheets

FIG. 5A
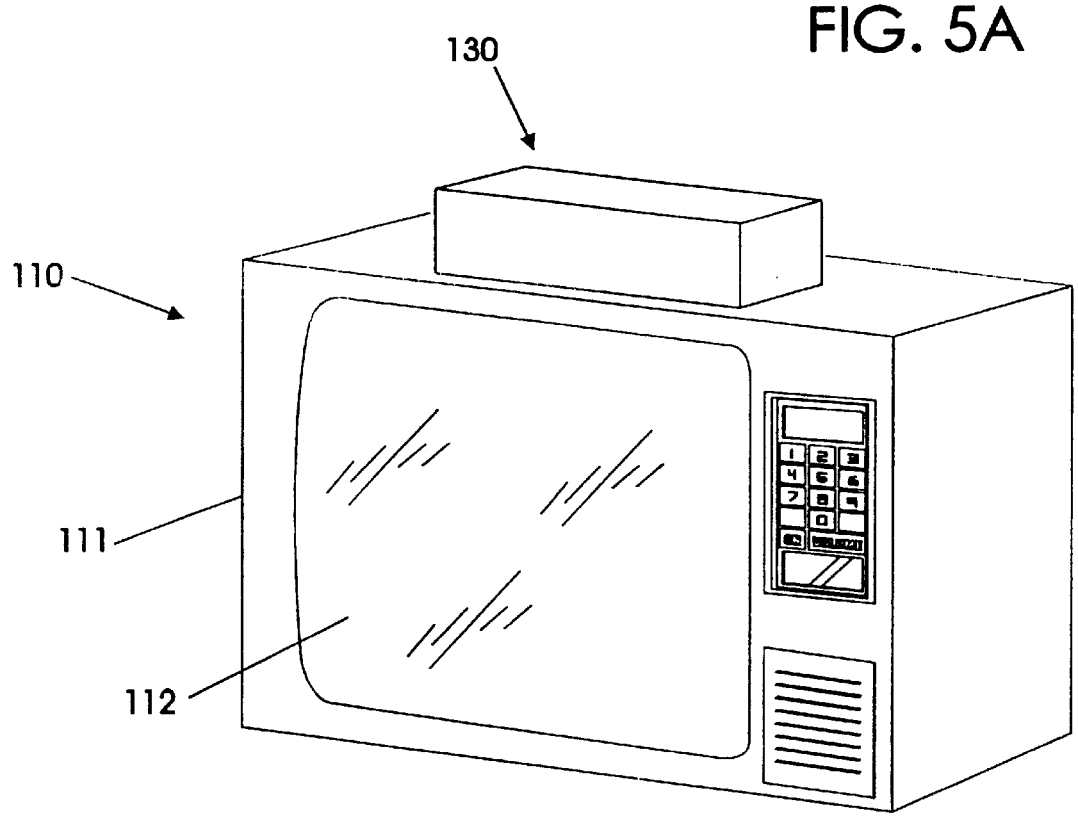
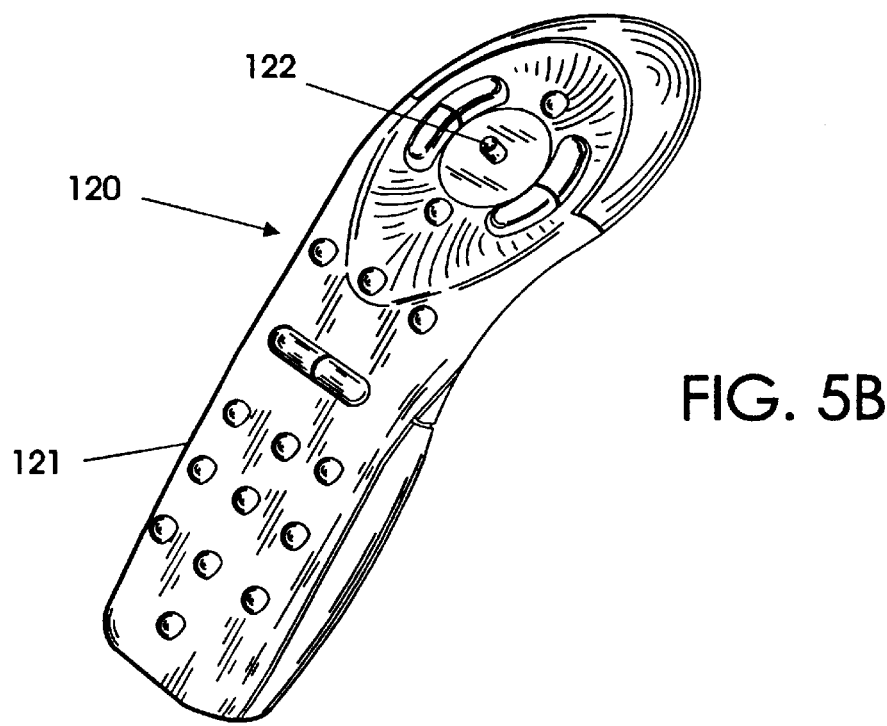
FIG. 5B

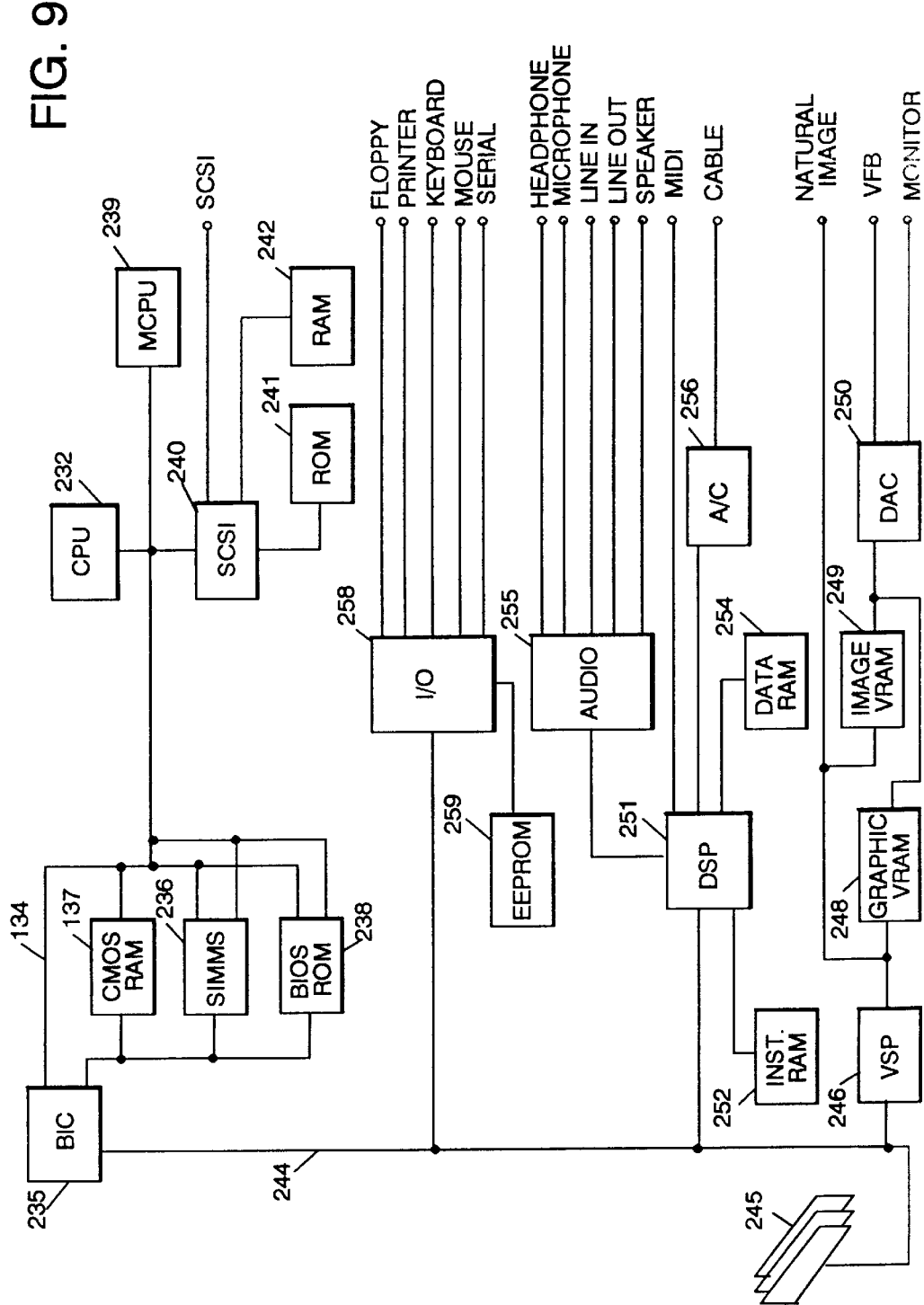

INFORMATION HANDLING SYSTEMS WITH BROADBAND AND NARROWBAND COMMUNICATION CHANNELS BETWEEN REPOSITORY AND DISPLAY SYSTEMS

BACKGROUND OF THE INVENTION

Personal computer systems in general and IBM personal computers in particular have attained widespread use for providing computer power to many segments of today's modern society for handling information in the form of digital data. Personal computer systems usually are a desk top, floor standing, or portable microcomputer that consists of a system unit having a single system processor and associated volatile and non-volatile memory; a display; a keyboard or touchscreen input device; data storage in the form of one or more diskette or fixed disk drives or a volatile memory equivalent; and possibly an optional printer or other output device. One of the distinguishing characteristics of these systems is the use of a motherboard or system planar to electrically connect a number of components together. These systems are designed primarily to give independent information handling system power to a single user and are inexpensively priced for purchase by individuals or small businesses. Examples of such personal computer systems are the personal as the PERSONAL COMPUTER AT, PERSONAL SYSTEM/2, PS/1, Aptiva, PC300, PC700, and the like. Persons of skill in the computer arts will be familiar with these systems.

These personal computer systems can be classified into families based on bus architecture. One family, referred to here as the ISA family, use a bus architecture exemplified by the IBM PERSONAL COMPUTER AT and other "IBM compatible" machines. A second family use IBM's MICRO CHANNEL bus architecture exemplified by IBM's PERSONAL SYSTEM/2 Models 50 through 95. The ISA family originally used the popular INTEL 8088 or 8086 microprocessor as the system processor. These processors have the ability to address one megabyte of memory. The second family models typically used the high speed INTEL 80286, 80386, 80486, or Pentium brand microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, ISA family systems have developed toward ever higher capability central processor units and bus architectures, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which information handling is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information handling work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the pager and cellular telephone networks mentioned hereinafter, the possibility arose of eliminating the wireline connection between a personal computer system and a supporting server. Such information handling systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of users will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

At the same time that the developments briefly reviewed above have been occurring, there have been somewhat parallel developments in the fields of entertainment and consumer electronics at least partly fueled and driven by the developments mentioned. These developments have included a trend from broadcast television first to cable distribution systems and more recently to satellite direct broadcast systems or hybrids in which broadcast channels include both satellite links and microwave local area links. With such broadcast developments have come devices known as "set top boxes" from the fact that such systems are usually associated with a conventional television receiver, as by being mounted in a housing or "box" placed atop the receiver set, hence the common name given here. The information handled in this environment is primarily for entertainment purposes, and may be either analog or digital as broadcast. The broadcasts are typically of a type here called "broadband", in that the data channel is relatively broad and covers a significant span of the electromagnetic spectrum whether distributed by direct broadcast, by cable or optical link, by direct satellite broadcast, or by some hybrid information handling system. A typical broadband channel may be assigned a frequency range of six megahertz or the like.

Other areas of development, as briefly mentioned above, include paging technology in which a small consumer or business purpose device receives unidirectional broadcasts of identified signals causing data, such as a telephone number to which a call should be returned, to be displayed for a user. Recent pager development has reached for bidirectional communication capability. Cellular telephone capability became first a business tool and more recently a consumer commonplace for connection into the older PSTN systems. Such transmissions typically are over narrowband channels, which may be assigned a frequency range of a few hundred hertz or the like. Narrowband radio links have the advantages of having the best radio sensitivity and range, allowing the use of lower power transmitters, being controlled by government franchise against interference, and using a known, established technology. Such links have disadvantages in being limited to lower data rates, frequently around 9.6 Kbits/sec., which in turn limit the practicality of repeaters and data networks, requiring governmental licensing and re-licensing for any frequency change, and limited access due to prior demand and establishment of channels.

Where bidirectional, the various information handling systems described above are characterized by having limited data rates and very high cost per byte of data transferred. The data rates of these systems (including data over analog cellular, CDPD, all the digital cellular systems, ARDIS and RAM) is, or will be, no more than a wireline, standard telephone modem, generally limited at the time of the writing this description to a maximum under most favorable conditions oft 28.8 Kbits/sec. This is believed to be the reason that all presently commercially successful wide-area information handling systems relying on a wireless link involve short messages only (pagers and to a much lesser extent ARDIS and RAM).

What is needed is a new high-speed and low cost data link that will enable proliferation of the wireless data revolution. Hints at the direction of technology development which will enable that link, as disclosed more fully hereinafter, can be found in certain prior disclosures, such as Foglia U.S. Pat. No. 4,885,747 issued 5 Dec. 1989 and Freitas et al. U.S. Pat. No. 5,321,542 issued 14 Jun. 1994, both assigned to the assignee of the present subject invention.

Yet another influence on the significance of data links is the coming convergence of what has been known as television and what have been known as personal computer applications. At the time of writing of this specification, there are appearing in the marketplace consumer systems which combine personal computer functionality, such as internet access and the like, with television access and displays. As such convergence continues (and anticipation of that convergence is well documented in the popular press), there will develop increasing demand for data distribution. There are already appearing in some industry publications discussions of the "bottleneck" which is being or will be imposed by the distribution of data which will be requested from such converged system users.

SUMMARY OF THE INVENTION

With the foregoing as background, the present invention contemplates information handling systems in which asymmetric data traffic is accommodated. In realizing such systems, two channels for communication of data between a repository system and a display system are defined. One is a broadband channel for transmission of data from the repository system. The other is a narrowband channel for transmission and reception of data from and to the repository system and a display system.

Information handling systems as contemplated by this invention may take a variety of forms in detail. However, the systems of this invention are generally distinguished in that larger data files are exchanged through the broadband channel while smaller data files are exchanged through the narrowband channel.

In accordance with embodiments of this invention described hereinafter, the communication protocols used in the broadband and narrowband channels differ. Further, one or both the the channels may be defined by wireless connectivity or by wireline connectivity.

BRIEF DESCRIPTION OF THE DRAWINGS

Some of the purposes of the invention having been stated, others will appear as the following description proceeds, when taken in connection with the accompanying drawings, in which:

FIG. 5A and 5B are views of a set top box, television receiver and remote control which are together useful as a display system in the practice of this invention;

FIG. 9 is a schematic showing of certain circuitry elements embodied in the personal computer system of FIG. 7.

DESCRIPTION OF THE PREFERRED EMBODIMENT(S)

Figure 1:
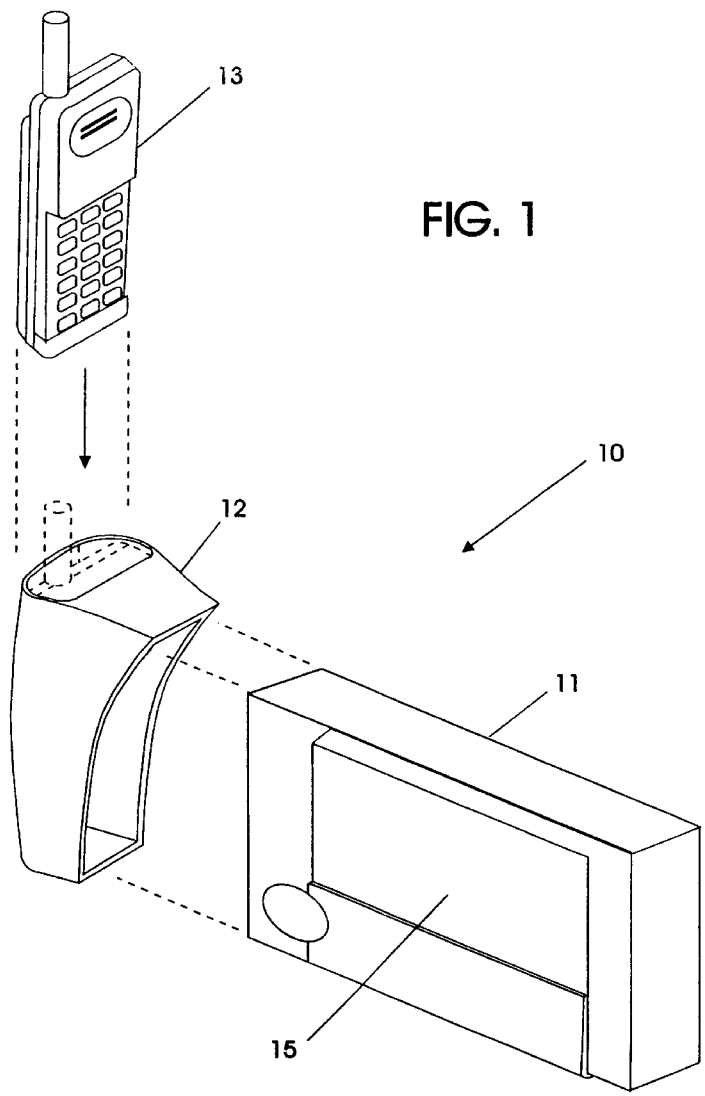
FIG. 1 is an exploded perspective view of certain elements of a mobile client computer system useful as a display system in the practice of this invention.

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Further on in this description there will be, for completeness, descriptions of certain constituents of an information handling system which embodies the present invention. After a foundation has been laid by a description of overall information handling system concepts and embodiments, attention will be turned to user systems which provide the point at which a subscriber, end user or human operator will encounter the information handling systems of this invention. The user systems to be later described will include a mobile client system, a set top box, and a personal computer system.

An October, 1993 report on *The Infopad Project* issued by the Electrical Engineering Department at the University of California at Berkeley reached a conclusion that data transactions, unlike voice transmissions, are asymmetrical. In other words, there is a great deal more data flowing from the server to the subscriber than from the subscriber to the server. None of the existing wide area wireless networks take advantage of this situation. Indeed, most are modeled after the old voice symmetry model.

The INTERNET provides an example for intuitive understanding of this asymmetry. When "cruising the web", a client data display system typically sends a repository system for storing, accessing and distributing data, responds with files that are much larger than the requests sent by the client.

This asymmetric traffic pattern can be used to great advantage in both wireless and wired information handling systems involving repository and display systems. In wireless systems, mobile unit narrowband transmitters are limited to about 1 watt RF output power. This power level is consistent with both portable battery technology and recommended limits for health concerns. One watt or less is sufficient power for successful transmission of relatively low data rates (10–20 Kb/sec) over "wide" ranges (10–20 miles). Existing wide-area data systems using cellular or packet techniques can provide reliable data rates somewhat less than a standard telephone modem in both directions. Systems employing much higher data rates using 1 watt of power will be limited to shorter ranges. For a given power, the higher the data rate, the shorter the range.

In contrast, base stations can run substantially much higher power levels since their antennas are located far away from humans (mitigating the health concerns) and have access to power mains (no restrictions on batteries). Higher power directly implies higher data rates.

Therefore the realities of radio physics, state-of-the-art technologies, and human requirements meet in the following inventive paradigm.

Consider a hand-held PCA device (as will be described more fully hereinafter) that contains narrowband, transceiver cellular telephone and cellular data capability either using CDPD or directly accessing the data communication capabilities of D-ANWS, CDMA and/or GSM. This single bidirectional, narrowband radio transceiver provides wide-area voice and the uplink of data to a repository system. Also, for short messages (i.e., two-way paging, E-mail etc.) this cellular link will be adequate. In accordance with this invention, the PCA also has a standard TV tuner and a CDMA demodulator. A TV channel is 6 MHz wide, enough to accommodate a unidirectional broadband transmission of up to 10 Mb/sec. total data throughput.

In accordance with some embodiments of this invention, the data display system requests files via HTTP commands over the slow, narrowband bidirectional, cellular link, and the repository system responds, perhaps at 250 Kb/sec., downloading the file on the broadband unidirectional TV link. The same model is applicable to the largely one-way cable TV system. A set-top or personal computer system (as described more fully hereinafter) requests a file over a standard telephone modem, and the download comes down a TV channel over the cable. A TV tuner/CDMA demodulator as used in the display system can bridge the cable to a standard data communications port on the computer with blazing speed.

The use of CDMA on an existing TV channel would appear to be an unused channel to a conventional television set since CDMA emulates Gaussian noise. A client display system device such as a PCA which has a display screen, a TV tuner, a speaker and an antenna, could also perform as a standard TV receiver with the addition of a few standard low cost integrated circuits.

Information handling systems in accordance with this invention fit nicely with the traditional existing model of television broadcasting in the United States. Such systems could be identified as "commercial" or as non-commercial, "educational".

A television/CDMA scheme is inherently scalable. A metropolitan area would initially be covered by a single high power standard TV broadcast station. The only difference is that the transmitter would not transmit video and audio but a phase-modulated CDMA carrier. As capacity requirements increase, the one large station would be sold to another new service and several smaller cell stations would take its place. Eventually, the system could involve hundreds of small transmitters (perhaps co-located at cellular radio cell sites). All the system transmitters would operate on the same TV channel taking advantage of CDMA's unique optimized frequency reuse capabilities. Thus the same metropolitan license could be applied to one or an indefinite number of transmitters all operated by the same entity. Each transmitter could be simultaneously transmitting unique data or simulcasting identical data for all subscribers.

A 100 cell site system would provide a metropolitan area with a staggering 1 giga-bit/sec. Information handling capacity. Magnetic tape recorders (standard VCRs) could be used for re-broadcasting and keeping actual records of broadcasts for auditing and liability purposes.

Information Handling System with Mobile Client Display System

Figure 2:
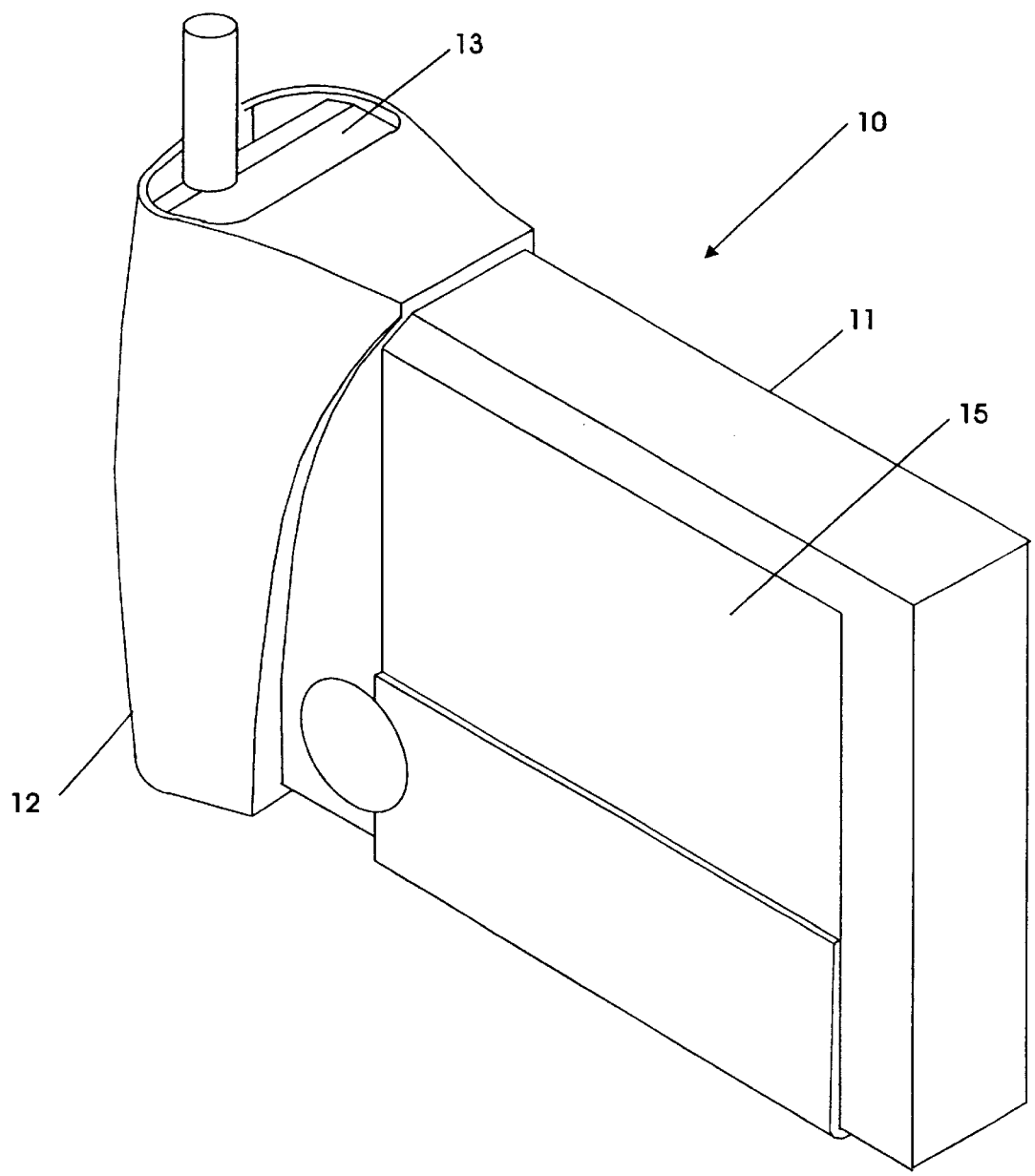
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a narrowband bidirectional radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another.

More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

License free spread spectrum radio links have advantages in that much higher rates of data transfer are attainable, on the order 200 Kbits/sec., to 2 Mbits/sec., faster response times down to less than one second are attainable, repeaters and large radio frequency networks are practical due to high data rates, government licensing is relaxed or unnecessary, and flexibility is allowed for modulations and channel restrictions. Spread spectrum radio links have disadvantages in that higher frequency bands may require higher cost radios, transmission power is restricted, the wider band coverage results in lowered sensitivity and reduces maximum range, and there is as yet no clear universal standard.

Among specific types of spread spectrum links, frequency hopping technology has advantages in using simple frequency modulated transceivers with narrower baseband bandwidth circuits and better rejection of interferers. Frequency hopping technology has disadvantages in being limited by governmental regulation to lower data rates by limited channel bandwidths and increases in system overhead which reduce throughput. Direct sequence spread spectrum has advantages in allowing wider bandwidths which permit higher data rates up to 2 Mbits/sec. and faster response. DS-SS has disadvantages in that the baseband stage of the transceiver used is more complex, and inband interference is more likely.

Figure 3:
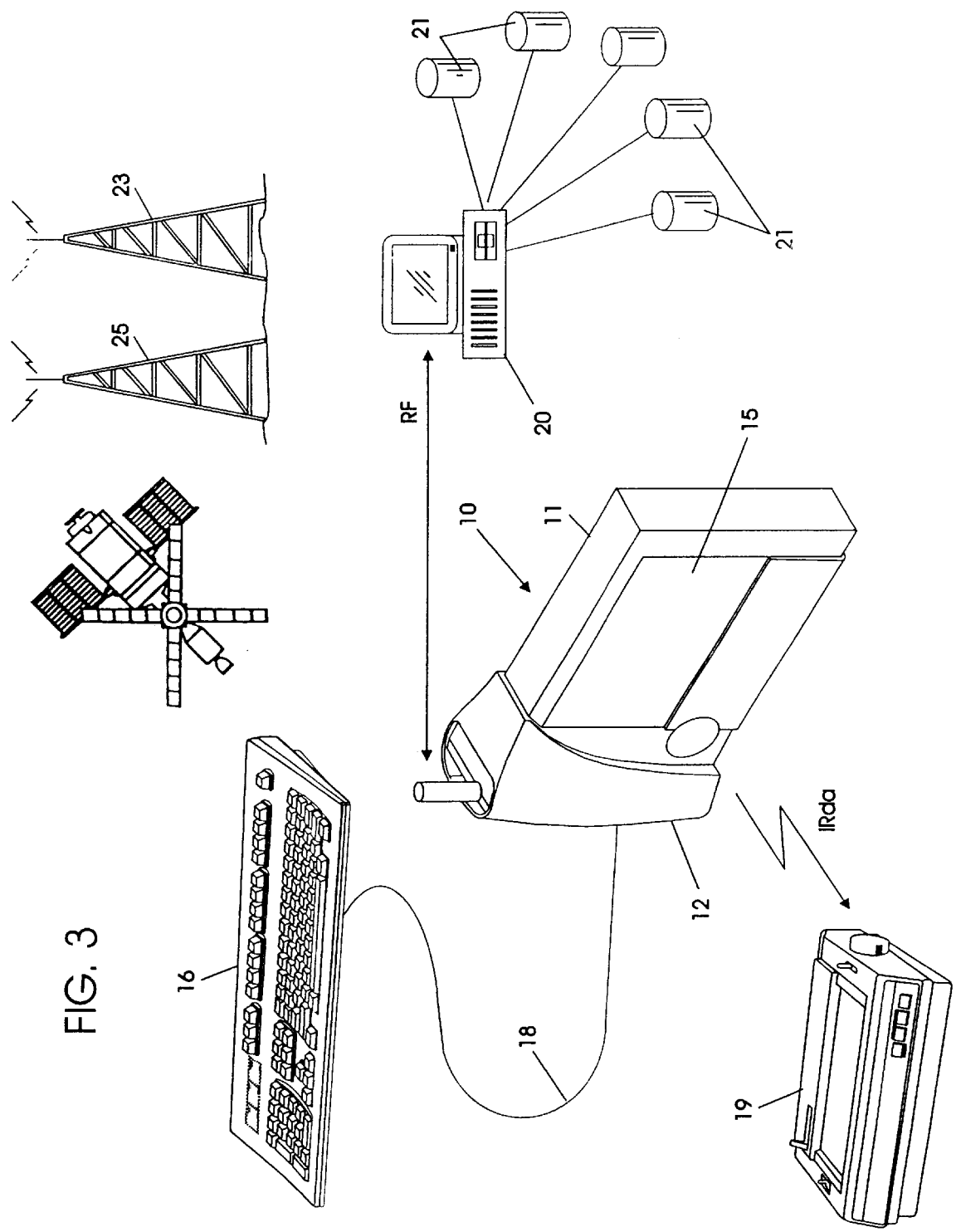
FIG. 3 is a diagrammatic representation of relationships among a mobile client system as shown in FIGS. 1 and 2 and supporting peripherals and systems including a repository system and associated transmitters and transceivers.

FIG. 3 schematically indicates the relationships among a data display system 10 and supporting servers and peripherals. More attention will be devoted to the relationships explicit in FIG. 3 at a later point in this description. While the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

The radio transceiver 13 provides a narrowband bidirectional radio frequency link to a server indicated at 20, which may communicate by wireline with supporting mainframe data storage 21. The server 20 and mainframe storage 21 together define a data repository system storing, accessing and distributing data as described here. Data relevant to the operation of the entire enterprise will be maintained on the supporting mainframe, and made available to the mobile client 10. The radio transceiver 13 functions as a portion of a narrowband data communication channel which allows for bidirectional communication of data between the mobile client system 10 and the server 20 and mainframe data storage 21. The channel is defined by a narrowband transceiver 23 operatively coupled with the repository system 20, 21 and establishing the frequencies and protocols for communication. The radio transceiver 13 is attuned to the transceiver 23. The protocols used for the link may include certain ones familiar from wireline connections, such as Ethernet, Token-ring, TCP/IP, LAT and SNA. Discussions of protocols possibly applicable can be found in the specifications of Harrison et al. U.S. Pat. No. 5,068,916 issued 26 Nov. 1991 and Perkins U.S. Pat. No. 5,159,592 issued 27 Oct. 1992, both assigned to the assignee of the present invention.

Additionally, the repository system 20, 21 has coupled therewith a broadband transmitter 25 which establishes the frequency range and the protocols for a broad bandwidth channel through which digital data derived from the repository system is transmitted. The display system 10 has disposed therewithin a broadband receiver which is attuned to the broad bandwidth channel and receives digital data transmitted by the broadband transmitter. In certain embodiments of this invention, the broad bandwidth channel is a television transmission channel as presently licensed by the Federal Communications Commission, with the data signal using a conventional television broadcast channel and CDMA baseband technology. The broad bandwidth channel may, in accordance with this invention, be made available by conventional broadcast, cable distribution, satellite distribution, or some hybrid such as satellite linked to local microwave. The channel may also be by physical connection such as fiber optic or conventional cable distribution. In any such instance, conventional broadcast equipment and/or existing facilities can be used. The CDMA exciter would be the only proprietary equipment required.

The display system 10, server 20, mainframe storage 21 and associated transmitter, receiver, and transceivers together form an information handling system accommodating an asymmetric traffic pattern which has a data repository system storing, accessing and distributing digital data; a data display system accessing and displaying data derived from the repository system; a broadband transmitter operatively coupled with the repository system and defining a broad bandwidth channel through which digital data derived from the repository system is transmitted; a broadband receiver disposed within the display system and attuned to the broad bandwidth channel and receiving digital data transmitted by the broadband transmitter; a first narrowband transceiver operatively coupled with the repository system and defining a narrow bandwidth channel through which digital data is transmitted to and received from the repository system and the display system; and a second narrowband transceiver disposed within the display system and attuned to the narrow bandwidth channel through which digital data is transmitted to and received from the display system and the repository system. The broad bandwidth channel and narrow bandwidth channel cooperate, through the transmitter, receiver, first and second transceiver for exchange of larger data files through the broadband channel and exchange of smaller data files through the narrowband channel.

As will be clear, the broadband transmitter and first narrowband transceiver each define a communications protocol. This invention contemplates that the protocol defined for the broadband channel will differ from that defined for the narrowband channel.

The present invention also contemplates that the elements of the information handling system will cooperate one with another in particular manners. One such manner will have the repository system and the broadband transmitter cooperating to transmit repetitively and substantially continually a data stream including data files having a predefined content such as sports scores, stock quotations, etc. In order to effectively recover data from such repetitive broadcasts, the display system (as described for the mobile client system 10) will have a processor, memory operatively connected with the processor, and a data selection program stored in the memory accessibly to the processor. The program and processor will cooperate, upon execution of the program by the processor, in selecting from the data stream as received by the broadband receiver data files having content determined by the program. Thus a user desirous of knowing sports scores, or even the reported progress of a specific event, will be continually updated by the repetitive broadcasts.

The present invention contemplates that a user of a display device, such as the mobile client system, may use an input device associated with the system to input data defining a request for a specifically defined data file from among data stored in the linked repository system. When this is done, the display system transceiver will transmit to the repository system transceiver digital data derived from user input and expressing a defined request. The information handling system is also contemplated as having, in the repository system (which may include a personal computer system as herein described operated as a gateway server) a processor, memory operatively connected with the processor, and a data gathering program stored in the memory accessibly to the processor. The repository system data gathering program and processor are to cooperate, upon execution of the program by the processor, in recognizing a request for a specifically defined data file received by display system transceiver and gathering a requested data file. The program and processor would then further cooperate to transmit the gathered data file through the broadband transmitter 25 or through the narrowband transceiver 23.

In proceeding in the manner described, the present invention contemplates that the data gathering program and the processor of the repository system cooperate to determine the size of the gathered data file and to determine which one of the broad bandwidth channel and the narrow bandwidth channel is used for transmission of the gathered data file based upon the size of the data file to be supplied to the display system. Large data files would be supplied through the broadband channel, while small data files would be supplied through the narrowband channel. The division of transmissions is an economically determined decision, with appropriate consideration being given to promptness of required response, cost of delivery through the two channels, continuity of communication with the display system, and other factors.

Figure 4:
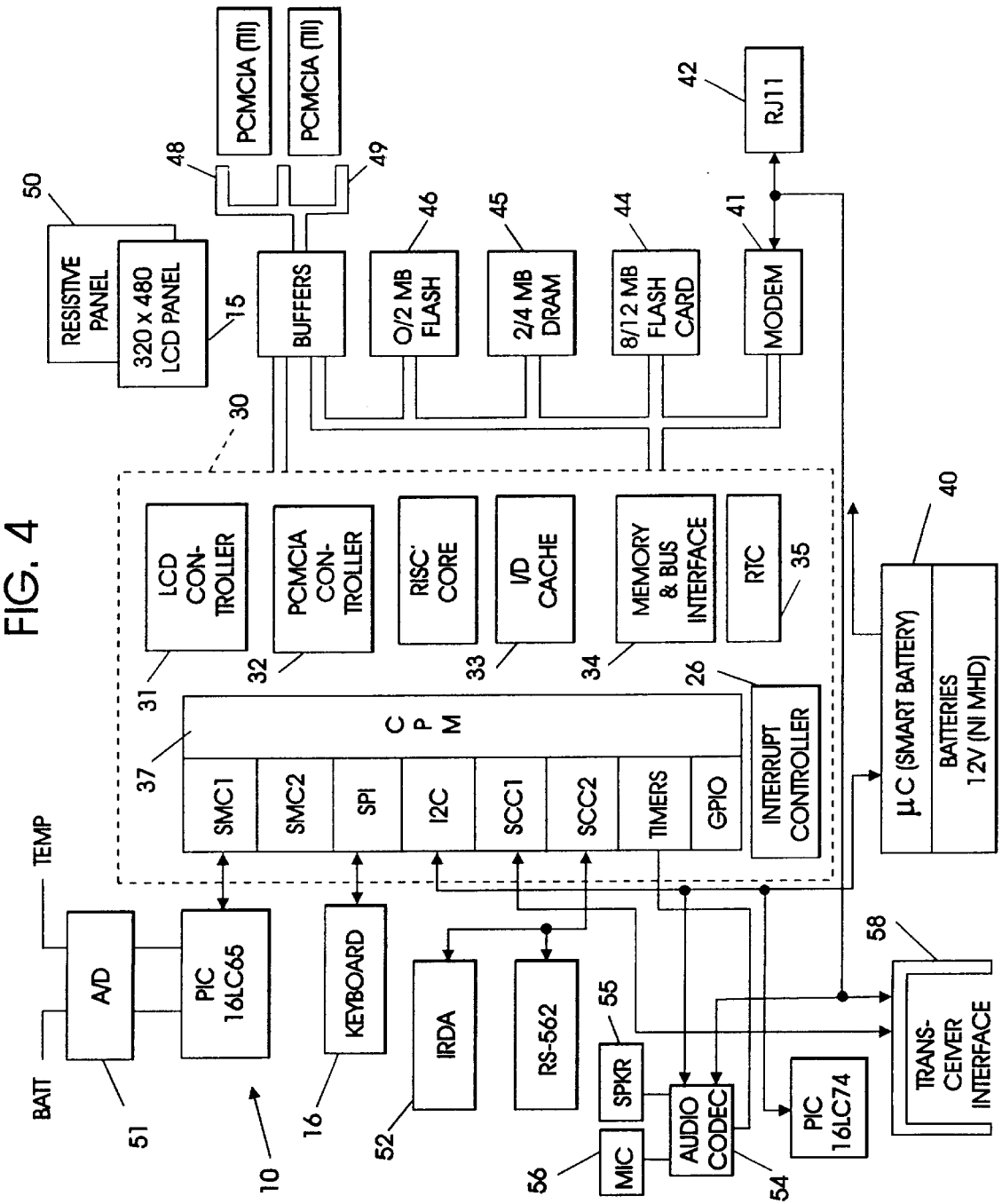
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics, The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44.; by dynamic random access memory (DRAM) 45; and by core flash memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designers choice of functions to be supported, processor core, and support logic.

Information Handling System with Set Top Box Display System

Another system environment is provided by set top devices which, as contemplated by this invention, may be in the form of cable tuner systems, such as are used in many homes to which video streams are delivered by cable distribution networks. Set top devices may have the capability of decoding satellite transmissions, or video signal streams distributed in digital form, with or without encryption. They may also be in the form of devices which include record/playback capability, such as VHS tape or videodisc. They may also be in the form known as game machines, of which the systems offered by Nintendo and Sega are perhaps the best known. They may include back channel capability, so as to return a signal to a distribution system, either directly over a distribution link or through an alternate channel such as a conventional telephone line. A set top device may include some of all of the capabilities of the systems briefly mentioned above, as well as others perhaps not here set out in such detail.

One such set top device is illustrated more specifically in FIGS. 5A and 5B, where are shown a television receiver 110, a remote control 120, and a set top device 130.

The television receiver 110 is preferably a device of the type available to any consumer from any supplier of television receivers, and will have a housing or cabinet 111 within which is arranged a video display device 112. Also housed within the housing or cabinet 111 is video reception circuitry (not shown in FIG. 5) which is coupled to the video display device for receiving signals transmitted at frequencies which are outside direct sensing by a human observer and for delivering to the video display device video signals which drive the video display device to display visual images perceivable by the human observer. The television receiver may be one configured to receive broadcast signals of NTSC or PAL standards or a "cable ready" receiver which implements a design capable of directly receiving a larger number of channels of analog signals such as may be distributed by a cable service provider. The television receiver may be one configured to receive a digital data stream, although at the time of writing of this disclosure such sets are not readily available commercially as a consumer product. Details of circuitry for such receivers may be found in any of a number of industry reference texts.

The video reception circuitry is contemplated as being capable of receiving signals which carry analog information defining visual images to be displayed; digitally coded information defining such visual images; or compressed digitally coded information defining such visual images. Such signals as contemplated as being transmitted by broadcast transmission or by cable transmission or by satellite transmission or by transmission through a telecommunications network.

Control over the functions of the display system may be exercised by a remote control, one form of which is shown in FIG. 5B at 120. The control 120 has a housing 121 sized to be held in the hand of a human observer of the images displayed on the display device. The housing, while shown to be of a configuration particularly intended to lie comfortably in the hand of a user, may taken any configuration which is reasonably held. The control 120 also has a manually engageable input device 122 mounted in the housing 121 for manipulation by the human observer and control transmitter circuitry mounted in the housing and coupled to the input device 122 for transmitting at a frequency which is outside direct sensing by the human observer command signals coordinated in a predetermined manner to manipulation of the input device 122 by the human observer. Such circuitry may be as used in other more conventional hand held remote control devices such as are widely used by consumer electronic systems such as television receivers and audio systems. As such, the circuitry may follow the teachings of manufacturers of such devices.

When so manipulated, the input device 122 will generate signals which, in the contemplation of this invention, will ultimately give effect to movement of a cursor or pointer display element across the field of view provided by the display device 112. Once such manipulation has positioned the pointer over an appropriate portion of the visual images displayed, then an action indicated by such an element may be selected by pressing on the input device 122.

The input device 122, while shown in one form, may take a variety of forms. In particular, the device 122 is shown as what is here called a "wiggle stick". A wiggle stick, in the contemplation of this invention, is an elongate member pivoted within the housing 121 of the remote control 120 and protruding therefrom. By suitable sensors, which may be strain gauge type devices or other electromechanical sensors, pressure exerted on the wiggle stick or physical movement thereof are transduced into electrical signals indicating manipulation by the human observer. Alternate forms of the input device 122 may be a wobble plate (similar to the device found on commercially available game controllers used with game machines accessories for television receivers), a trackball, a mouse, or an inertial mouse. The latter two forms of devices differ in that a mouse, as conventionally used with personal computer systems, rests upon a surface over which it is moved by a user to generate signals effecting movement of a cursor or pointer display element across the field of view provided by a display device while an inertial mouse references to a self contained inertial platform and may be manipulated free of a surface, as in the air. Such a device is also known as an air mouse.

The remote control device 120 is coupled to a display controller in one of a variety of manners. In the form illustrated in FIG. 5, the input device 120 is coupled by command transmitter circuitry mounted in the housing 121 and coupled to the input device 122 for transmitting at a frequency which is outside direct sensing by the human observer command signals coordinated in a predetermined manner to manipulation of the input device by the human observer. Such command signals, as is known to persons of skill in the arts related to other pointer control devices, may be emitted by an infrared radiation emitter, a radio frequency emitter, or an ultrasonic emitter. In other forms, described hereinafter in connection with the personal computer system of FIGS. 7 through 9, command signals may be transferred through an elongate flexible conductor.

Figure 6:
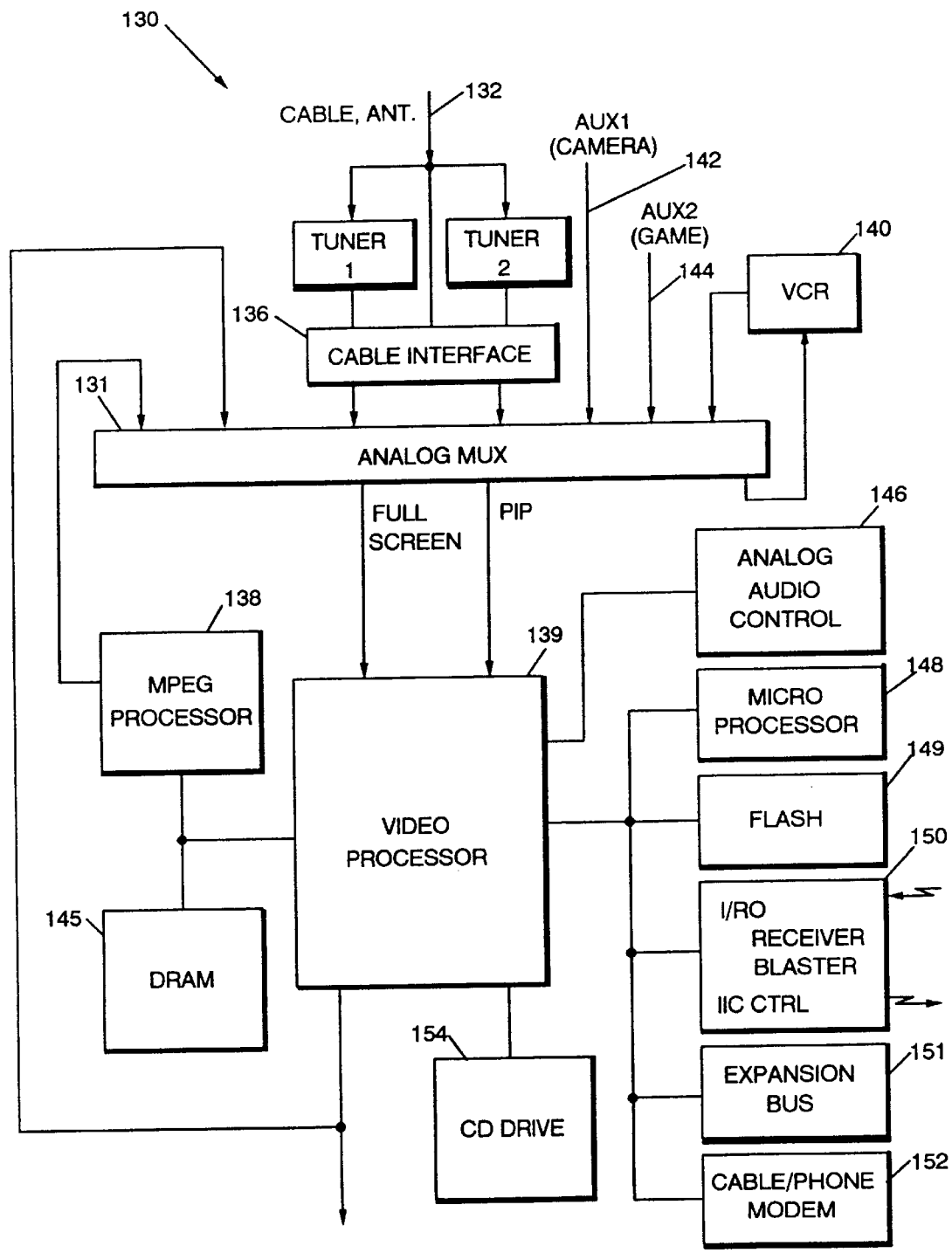
FIG. 6 is a schematic showing of certain circuitry elements embodied in the set top box of FIG. 5A.

One form of set top device 130 is more particularly shown in FIG. 6. However, it is to be recognized that the particular device here described is only one of a number of varieties of such devices as alluded to hereinabove. The illustrated embodiment preferably has an analog multiplexer 131 through which many of the signals flow among elements of the device 130 as illustrated in FIG. 6. Signals reaching the analog multiplexer 131 can arrive from an antenna or cable connection 132 through first or second tuners 134, 135 or a cable interface 136. The cable interface may allow for decryption of securely encoded signal streams, either on a single use ("Pay per view") or timed interval (subscription) basis. The analog multiplexer 131 also serves as a conduit for signal streams from the output of an MPEG processor 138, the video processor 139, a video recording/playback device 140 such as a VHS video cassette recorder/player or a videodisc player, and auxiliary devices such as a camera (not shown) through a camera auxiliary port 142 or a game machine (not shown) through a game auxiliary port 144.

The video processor 139 is an element of the set top device. In addition to the elements recited above, the processor 139 is operatively connected with system memory 145, an analog audio control 146, a microprocessor 148 functioning as a central processing unit or CPU, flash memory 149, an I/O processor 150 including an infrared receiver/blaster, an expansion bus 151, a cable or telephone modem 152, and a Compact Disk (or CD) drive 154.

The video processor 139 comprises the following functional blocks: a memory refresher, a video controller, a blitter graphical coprocessor, a CD drive controller, a digital signal processor (DSP) sound coprocessor, and an arbitrator to arbitrate the access to the system memory between the six possible bus masters (the CPU, the blitter, the DSP, the memory refresher, the video controller, and the CD drive controller). The arbitrator controls the changing priorities of the devices, as described herein, and is in electrical circuit communication with all the devices within the video processor 139. For example, the CPU 148 has the lowest priority of all bus masters until an interrupt occurs. Thus, the arbitrator is in circuit communication with both an interface to the CPU and an interrupt controller.

The CPU 148 has a SYSTEM bus associated with it. The SYSTEM bus includes a DATA bus, ADDRESS bus, and CONTROL bus. The video processor 139 is the arbitrator for the system memory 145; therefore, the SYSTEM bus is modified to a SYSTEM' bus (comprising a DATA' bus, ADDRESS' bus, and CONTROL' bus) by the video processor 139.

The system memory 145 comprises screen RAM, system RAM, and bootstrap ROM.

The I/O processor 150 interfaces the CPU 148 to numerous I/O devices, such as the remote control 120, a keyboard, a digitizer, a printer, or a touchpad. In a preferred embodiment, the I/O processor is a preprogrammed MC68HC705C8 (hereinafter "68HC705"), manufactured by Motorola Corp, running at 2 MHZ. The 68HC705 I/O processor is interfaced to the CPU 148 by configuring the 68HC705 as a peripheral device: (1) PA0–PA7 are connected to D0–D7 of the DATA bus; (2b) PB7, PB1, and PB2 are connected GPIO 1 (a 32-byte address range decoded by the video processor 39), A 1, and A 2, respectively, of the ADDRESS bus and CONTROL bus; and (3) PB3, PB4, and PB5 are connected to ADS, READY, and W/R, respectively, of the CONTROL bus. Thus, the I/O processor is decoded to have four 16-bit addresses in I/O space (referred to herein as AS0, AS2, AS4, and AS6). The I/O processor also interfaces with appropriate receiver circuitry which is able to detect and receive the signal packets emitted from the remote control 20.

Input devices are connected to the I/O processor 150 via a serial controller link and controllers. The controllers transform the signaled movements of control devices into a format suitable for transmission along the serial link. The controllers send data packets via the controller serial data link to the system unit. The data packets differ depending on the type of IO device. Co-ordinate type devices (such as those with which the present invention is particularly concerned including a wiggle stick, wobble plate, mouse, joystick, etc.) have a different data packet then a switch closure type of device (keyboard, digital joystick, switch pad, etc). The controllers will include receivers appropriate to any signals emitted by a remote control device 120, such as infrared receivers, radio receivers, etc.

As alluded to hereinabove, the CPU 148 generates multiple buses: a DATA bus, ADDRESS bus, and CONTROL bus, as are well known in the art. These three buses are collectively referred to as the SYSTEM bus. In the preferred embodiment, the CPU 48 is an 80376, manufactured by Intel Corp., 3065 Bowers Ave., Santa Clara, Calif. 95051. The 80376 is a variation of the well known 80386SX, which is well known in the art and also available from Intel Corp. The 80376 differs from the 80386SX in that the 80376 starts up in 32-bit mode, rather than 16-bit mode. Specifically, the CR0 register is forced to a 0011 H (0011 in hexadecimal notation) state with bit 0 forced to a logical ONE, effectively making the 376 operate in a 32-bit memory mode. Paging is enabled to allow virtual 386 operation.

The present inventions contemplate that the CPU may access control programs stored, for example, in the set top device system memory 145 so as to be accessible to the processor, for controlling the display of visual images by said video display device. As will be understood by persons of skill in the design of program controlled digital devices, the processor accessing such a control program will be capable of loading the control program and operating under the control of the control program so as to accomplish the functions established by the author of the program. Such a control program may, for example in this disclosure, cause the command receiver circuitry associated with or embedded in the I/O processor 150 which receives command signals from the command transmitter circuitry of the remote control 120 to derive from the received command signals image directing signals directing modification of visual images displayed on the display device. Further, the control program will cause command processor circuitry in the video processor 139 which is coupled to the command receiver circuitry and to the video reception circuitry in the television receiver 110 to receive the image directing signals and modify the visual images displayed on the device 112 as directed by manipulation of the remote control by a human observer.

In executing control programs, the systems here described will receive and store and deliver digitally encoded data in memory devices and execute in a microprocessor coupled to the memory devices digitally encoded control programs stored in the memory devices. The control programs will be effective on execution by the microprocessor for modifying video signals in predetermined manners in response to predetermined image directing signals derived from manipulation of the remote control 120. Such execution of a control program will include controlling microprocessor access to operational resources of the television video display device by execution of an operating system program and/or controlling modification of the video signals by execution of an application program. That is, the control exercised is based upon both operating system allocation of resource access and application program utilization of accessed resources.

Similarly, the present invention contemplates that the benefits of these inventions may be gained through use of personal computer systems. One such personal computer system is illustrated in FIG. 7.

Figure 7:
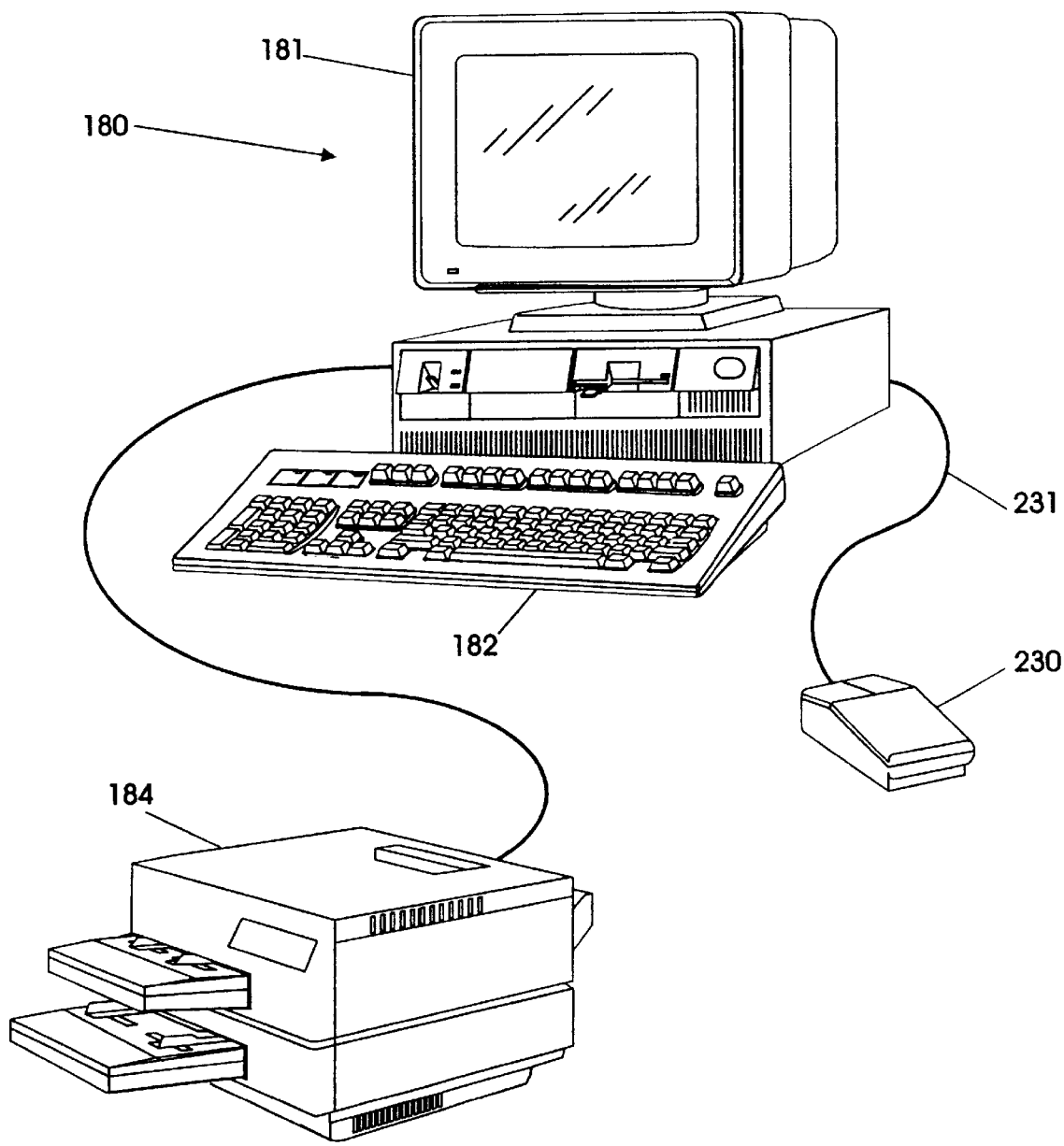
FIG. 7 is a view of a personal computer system useful as a display system in the practice of this invention.
Figure 8:
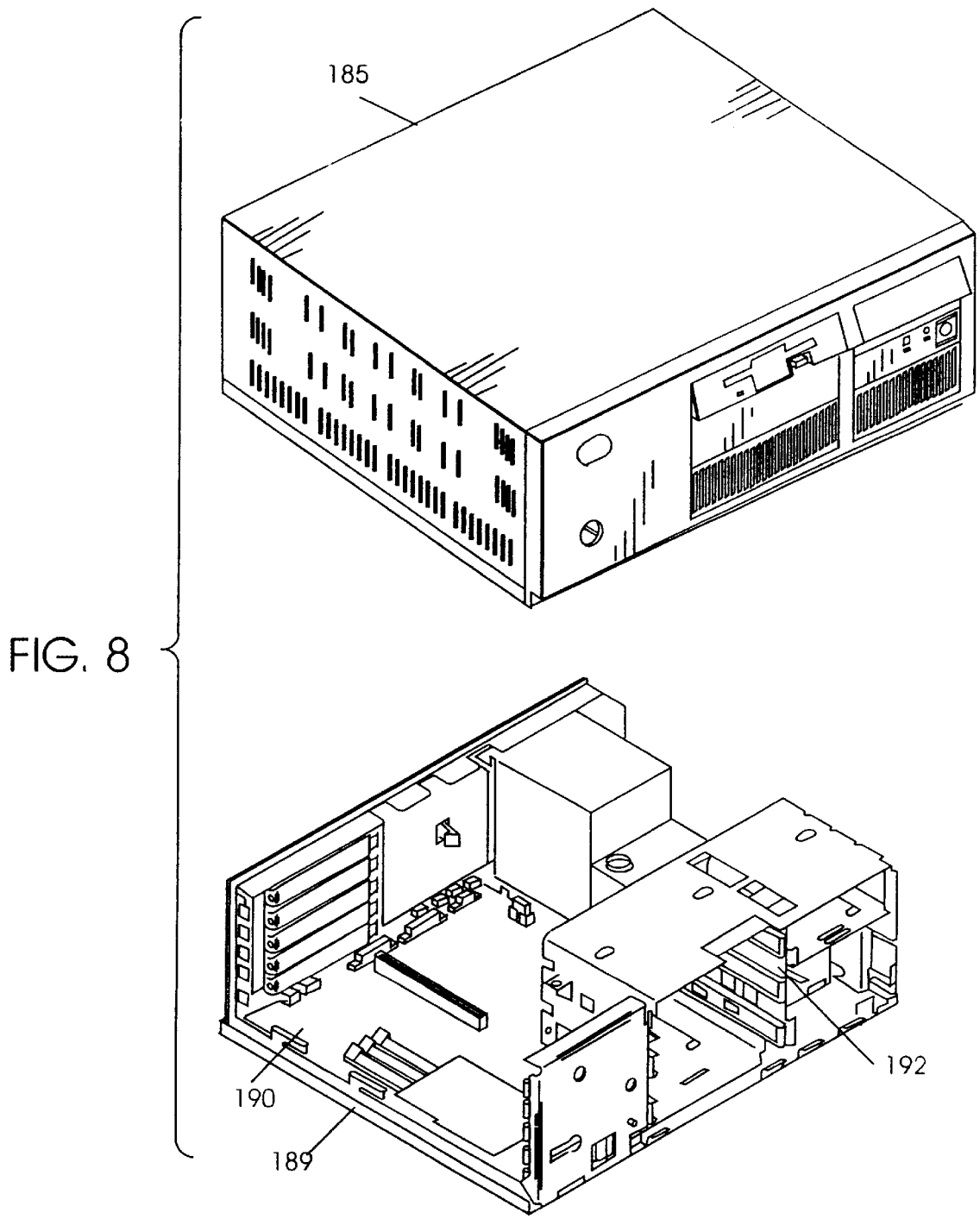
FIG. 8 is an exploded perspective view of certain elements of the personal computer system of FIG. 7.

Referring now more particularly to FIGS. 7 through 9 of the accompanying drawings, a personal computer system embodying the present invention is there shown and generally indicated at 180 (FIG. 7). The computer 180 may have an associated monitor 181, keyboard 182 and printer or plotter 184. The monitor 181 functions as the display device in displaying to a human observer visual images derived from video data, in similarity to the CRT 112 of the television receiver illustrated in FIGS. 5A. The computer 180 has a cover 185 which cooperates with a chassis 189 in defining an enclosed, shielded volume for receiving electrically powered data processing and storage components for processing and storing digital data, as shown in FIG. 8. At least certain of these components are mounted on a multi-layer planar 190 or motherboard which is mounted on the chassis 189 and provides a means for electrically interconnecting the components of the computer 180 including those identified above and such other associated elements as floppy disk drives, various forms of direct access storage devices, accessory cards or boards, and the like.

The chassis 189 has a base and a rear panel (FIG. 8) and defines at least one open bay for receiving a data storage device such as a disk drive for magnetic or optical disks, a tape backup drive, or the like. In the illustrated form, an upper bay is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay.

Prior to relating the above structure to the present invention, a summary of the operation in general of the personal computer system 180 may merit review. Referring to FIG. 9, there is shown a block diagram of a personal computer system illustrating the various components of the computer system such as the system 180 in accordance with the present invention, including components mounted on the planar 190 and the connection of the planar to the I/O slots and other hardware of the personal computer system. Connected to the planar is the system processor 202. While any appropriate microprocessor can be used as the CPU 202, one suitable microprocessor is the 80386 which is sold by INTEL. The CPU 202 is connected by a high speed CPU local bus 204 to a bus interface control unit 105, to volatile random access memory (RAM) 206 here shown as Single Inline Memory Modules (SIMMs) and to BIOS ROM 208 in which is stored instructions for basic input/output operations to the CPU 202. The BIOS ROM 208 includes the BIOS that is used to interface between the I/O devices and the operating system of the microprocessor 202. Instructions stored in ROM 208 can be copied into RAM 206 to decrease the execution time of BIOS.

While the present invention is described hereinafter with particular reference to the system block diagram of FIG. 9, it is to be understood at the outset of the description which follows that it is contemplated that the apparatus and methods in accordance with the present invention may be used with other hardware configurations of the planar board. For example, the system processor could be an Intel 80376 or 80486 microprocessor.

Returning now to FIG. 9, the CPU local bus 204 (comprising data, address and control components) also provides for the connection of the microprocessor 202 with a math coprocessor 209 and a Small Computer Systems Interface (SCSI) controller 210. The SCSI controller 210 may, as is known to persons skilled in the arts of computer design and operation, be connected or connectable with Read Only Memory (ROM) 211, RAM 212, and suitable external devices of a variety of types as facilitated by the I/O connection indicated to the right in the Figure. The SCSI controller 210 functions as a storage controller in controlling storage memory devices such as fixed or removable media electromagnetic storage devices (also known as hard and floppy disk drives), electro-optical, tape and other storage devices.

The bus interface controller (BIC) 205 couples the CPU local bus 204 with an I/O bus 214. By means of the bus 214, the BIC 205 is coupled with an optional feature bus such as an Industry Standard Architecture (ISA), MICRO CHANNEL, EISA, PCI, or other bus having a plurality of I/O slots for receiving adapter cards 215 which may be further connected to an I/O device or memory (not shown). The I/O bus 214 includes address, data, and control components. The adapter cards mounted in the slots may, if useful in practice of the present subject invention, include a data broadcasting receiver card such as disclosed in Virginio et al. U.S. Pat. No. 5,245,429 issued 14 Sep. 1993 and assigned to the assignee of the present subject invention.

Coupled along the I/O bus 214 are a variety of I/O components such as a video signal processor 216 which is associated with video RAM (VRAM) for storing graphic information (indicated at 218) and for storing image information (indicated at 219). Video signals exchanged with the processor 216 may be passed through a Digital to Analog Converter (DAC) 220 to a monitor or other display device.

Provision is also made for connecting the VSP 216 directly with what is here referred to as a natural image input/output, which may take the form of a video recorder/player, camera, etc. The VSP may take the form of the video processor 39 and associated circuitry described above with reference to FIGS. 5 and 6, in which event the CPU 202 may function, as to video control, similarly to the CPU 248 described above.

The I/O bus 214 is also coupled with a Digital Signal Processor (DSP) 221 which has associated instruction RAM 222 and data RAM 224 available to store software instructions for the processing of signals by the DSP 221 and data involved in such processing. The DSP 221 provides for processing of audio inputs and outputs by the provision of an audio controller 225, and for handling of other signals by provision of an analog interface controller 226.

Lastly, the I/O bus 214 is coupled with a input/output controller 228 with associated Electrical Erasable Programmable Read Only Memory (EEPROM) 229 by which inputs and outputs are exchanged with conventional peripherals including floppy disk drives, a printer 184, keyboard 182, a mouse or pointing device including a remote control such as the device 120, and by means of a serial port. In the form illustrated in the Figures here under discussion, the pointing device is in the form of a mouse 230 joined to the computer system by an elongate flexible conductor 231.

In the instance of each form of data display system described hereinabove, the present invention contemplates that provision will be made for a broadband receiver and a narrowband transceiver disposed within the display system for coupling to a data repository system as described hereinabove. The communications between the data repository system and the data display system will be along two channels, namely the broadband channel for unidirectional communication, and the narrowband channel by bidirectional communication. The processors provided in the data display systems will, by execution of appropriate control programs, be able to coordinate the exchange of smaller data files through the narrowband channel and larger data files through the broadband channel.

While described to this point as a system which contemplates a bilateral transmission of data, there is yet another application of much of the technology described. This other and further application may be succinctly described as a customized newspaper equivalent. That is, an end user of one of the systems described above may be enabled to have selected data drawn from a continuously broadcast stream of data and displayed for observation.

To expand on this briefly stated concept, the systems described above all include a processor and memory useful for storing control programs accessibly to the processor. The systems also all include a receiver for the broadband transmissions. The present invention contemplates that the broadband transmissions, with the large data volume flow available, may include essentially continuous, constantly updated, transmission of selected classes of data. Examples may include sports scores, running reports of sports events in progress, weather observations, business news, and the like. With appropriate programs stored in and executing on the processors of the end user systems, data received at the broadband receiver of a system may be constantly scanned for items previously identified by a user as being of interest. For example, a user particularly interested in tracking the progress of hurricanes might program his or her system to select from the continuously rebroadcast and updated data flow data related to such weather events and observations, and have the system display such data during its currency.

To expand on the latter point, weather observations regarding hurricanes are typically updated at predetermined intervals, for example every hour at fifteen minutes past the hour. Thus the data made available would be updated in the continuous rebroadcast on hourly intervals. The data might be included in the rebroadcast on a more frequent cycle, perhaps every five minutes. This allows for discontinuous access from a users system. That is, a user may program a system to access weather information every fifteen minutes and to continue displaying the last previous data until the next access. In such an instance, using the example of hurricane observations, the broadband transmissions would include such data every five minutes, based on the last previous hourly posting. However, the users display would be updated only every fifteen minutes, by recognizing the hurricane observation data and capturing it from the ongoing data flow in the broadband transmission.

In establishing such services, the present invention contemplates that there may well be various levels of subscription services, as well as "program guides" which would facilitate a user determining the specific services and update frequency to be chosen.

In the drawings and specifications there has been set forth a preferred embodiment of the invention and, although specific terms are used, the description thus given uses terminology in a generic and descriptive sense only and not for purposes of limitation.

What is claimed is:

1. An information handling system accommodating an asymmetric traffic pattern and comprising:
   a data repository system storing, accessing and distributing digital data;
   a data display system accessing and displaying data derived from said repository system;
   a broadband transmitter system operatively coupled with said repository system and defining a broad bandwidth channel through which digital data derived from said repository system is transmitted;
      said broadband transmitter system establishing a cellular communication channel having a plurality of transmission stations;
      each of said transmission stations simultaneously transmitting identical data being distributed to a plurality of data display systems and unique data being distributed to a unique, targeted display system;
   said repository system and said broadband transmitter cooperating for transmitting repetitively and substantially continually a data stream including as said identical data data files having a predefined content;
   a broadband receiver disposed within said display system, said receiver being attuned to said broad bandwidth channel and receiving said data stream transmitted by said broadband transmitter system;
      said broadband receiver receiving both said identical data being distributed to a plurality of data display systems and that portion of said unique data targeted to said display system;
   a first narrowband transceiver operatively coupled with said repository system and defining a narrow bandwidth channel through which digital data is transmitted to and received from said repository system and said display system;
   a second narrowband transceiver disposed within said display system, said transceiver being attuned to said narrow bandwidth channel through which digital data is transmitted to and received from said display system and said repository system;
   said broad bandwidth channel and said narrow bandwidth channel cooperating, through said transmitter, said receiver, said first transceiver and said second transceiver for exchange of larger data files through said broadband channel and exchange of smaller data files through said narrowband channel; and
   said display further comprising
      a processor
      memory operatively connected with said processor, and
      a data selection program stored in said memory accessibly to said processor,
      said program and said processor cooperating, upon execution of said program by said processor, in selecting from said data stream as received by said broadband receiver data files having content determined by said program.

2. An information handling system according to claim 1 wherein said broadband transmitter system and said first narrowband transceiver each define a communications protocol and further wherein the protocol defined for said broadband channel differs from that defined for said narrowband channel.

3. An information handling system according to claim 1 wherein at least one of said broadband transmitter system and said first narrowband transceiver establishes connection of said repository system and said display system by wireline connection.

4. An information handling system according to claim 1 wherein at least one of said broadband transmitter system and said first narrowband transceiver establishes connection of said repository system and said display system by wireless connection.

5. An information handling system according to claim 4 wherein both of said broadband transmitter system and said first narrowband transceiver establish connection of said repository system and said display system by wireless connection.

6. An information handling system according to claim 1 wherein one of said broadband transmitter system and said first narrowband transceiver establishes connection of said repository system and said display system by wireline connection and the other of said broadband transmitter and said first narrowband transceiver establishes connection of said repository system and said display system by wireless connection.

7. An information handling system according to claim 1 wherein said display system further comprises an input device enabling a user to input data defining a request for a specifically defined data file from among data stored in said repository system, and further wherein said second transceiver transmits to said first transceiver digital data derived from user input and expressing a defined request.

8. An information handling system according to claim 1 wherein said repository system comprises a processor, memory operatively connected with said processor, and a data gathering program stored in said memory accessibly to said processor, said program and said processor cooperating, upon execution of said program by said processor, in recognizing a request for a specifically defined data file received by said first transceiver and gathering a requested data file.

9. An information handling system according to claim 8 wherein said program and said processor cooperate, upon execution of said program by said processor, to transmit said gathered data file through said broadband transmitter system.

10. An information handling system according to claim 8 wherein said program and said processor cooperate, upon execution of said program by said processor, to transmit said gathered data file through said first narrowband transceiver.

11. An information handling system according to claim 8 wherein said program and said processor cooperate, upon execution of said program by said processor, to determine the size of the gathered data file and to determine which one of said broad bandwidth channel and said narrow bandwidth channel is used for transmission of the gathered data file.

12. An information handling system according to claim 1 wherein said broadband transmitter system establishes connection of said repository system and said display system by wireless connection.

13. An information handling system according to claim 12 wherein said broadband transmitter system establishes a radio frequency channel.

14. An information handling system according to claim 13 wherein said broadband transmitter system establishes a spread spectrum communication channel.

15. An information handling system according to claim 14 wherein said broadband transmitter system establishes a frequency hopping spread spectrum communication channel.

16. An information handling system according to claim 14 wherein said broadband transmitter system establishes a direct sequence spread spectrum communication channel.

17. An information handling system according to claim 16 wherein said broadband transmitter system establishes a code division multiple access communication channel.

18. An information handling system according to claim 13 wherein said broadband transmitter system establishes a radio frequency communication channel.

19. An information handling system according to claim 18 wherein said broadband transmitter system establishes a radio frequency communication channel in a predetermined portion of electromagnetic spectrum previously licensed for transmission of television broadcasts.

20. An information handling system according to claim 12 wherein said broadband transmitter system establishes a digital communication channel.

21. An information handling system according to claim 20 wherein said broadband transmitter system establishes a cellular digital packet data communication channel.

22. An information handling system according to claim 1 wherein said cellular communication channel has a plurality of terrestrial based transmission stations.

23. An information handling system according to claim 1 wherein said cellular communication channel has a plurality of satellite based transmission stations.

24. An information handling system according to claim 1 wherein said first and said second narrowband tranceivers establish connection of said repository system and said display system by wireless connection.

25. An information handling system according to claim 24 wherein said first and second narrowband transceivers establish a narrowband cellular communication channel.

26. An information handling system according to claim 25 wherein said narrowband cellular communication channel has a plurality of terrestrial based transmission stations.

27. An information handling system according to claim 25 wherein said narrowband cellular communication channel has a plurality of satellite based transmission stations.

28. An information handling system according to claim 24 wherein said first and said second narrowband transceivers establish a radio frequency communication channel through which digital data is transmitted.

29. An information handling system according to claim 1 wherein said first and said second narrowband transceivers establish a radio frequency channel.

30. An information handling system according to claim 29 wherein said first and said second narrowband transceivers establish a radio frequency communication channel in a predetermined portion of electromagnetic spectrum previously licensed for television broadcasts.

31. An information handling system according to claim 1 wherein said first and said second narrowband transceivers establish a digital communication channel.

32. An information handling system according to claim 31 wherein said first and said second narrowband transceivers establish a cellular digital packet data communication channel.

33. An information handing system according to claim 1 wherein said display system is a mobile client system.

34. An information handling system according to claim 1 wherein said display system is a set top box.

35. An information handling system according to claim 1 wherein said display system is a personal computer system.

36. An information handling system according to claim 1 wherein said repository system comprises a gateway server system and a mainframe data store.

37. An information handling system according to claim 1 wherein said broadband transmitter system establishes a radio frequency communication channel through which digital data is transmitted.

38. An information handling system according to claim 37 wherein said broadband transmitter system establishes a radio frequency communication channel in a predetermined portion of electromagnetic spectrum previously licensed for television broadcasts.

39. An information handling system according to claim 1 wherein said broadband transmitter system establishes a code division multiple access communication channel.

40. An information handling system according to claim 1 wherein said identical data comprises the major portion of data transmitted by broadband transmitter system.

41. An information handling system according to claim 40 wherein said unique data is distributed in response to a request transmitted from said data display system through said narrow bandwidth channel.

42. A display system operable in an information handling system having an asymmetric traffic pattern and comprising:

a broadband receiver attuned to a broad bandwidth radio frequency frequency hopping spread spectrum digital communication channel and receiving a digital data stream transmitted from a repository system by a broadband transmitter system, said broadband receiver receiving both identical data being distributed to a plurality of data display systems and unique data targeted to said display system;

a narrowband transceiver attuned to a narrow bandwidth channel and transmitting and receiving digital data exchanged with said repository system;

said broad bandwidth channel and said narrow bandwidth channel cooperating, through said receiver and said transceiver, for exchange between said display and repository systems of larger data files through said broadband channel and of smaller data files through said narrowband channel;

a processor, memory operatively connected with said processor, and a data selection program stored in said memory accessibly to said processor, said program and said processor cooperating, upon execution of said program by said processor, in selecting from said data stream as received by said broadband receiver data files having content determined by said program.

43. A display system operable in an information handling system having an asymmetric traffic pattern and comprising:

a broadband receiver attuned to a broad bandwidth radio frequency direct sequence spread spectrum digital communication channel and receiving a digital data stream transmitted from a repository system by a broadband transmitter system, said broadband receiver receiving both identical data being distributed to a plurality of data display systems and unique data targeted to said display system;

a narrowband transceiver attuned to a narrow bandwidth channel and transmitting and receiving digital data exchanged with said repository system;

said broad bandwidth channel and said narrow bandwidth channel cooperating, through said receiver and said transceiver, for exchange between said display and repository systems of larger data files through said broadband channel and of smaller data files through said narrowband channel;

a processor, memory operatively connected with said processor, and a data selection program stored in said memory accessibly to said processor, said program and said processor cooperating, upon execution of said program by said processor, in selecting from said data stream as received by said broadband receiver data files having content determined by said program.

44. A display system operable in an information handling system having an asymmetric traffic pattern and comprising:

a broadband receiver attuned to a broad bandwidth radio frequency code division multiple access direct sequence spread spectrum digital communication channel and receiving a digital data stream transmitted from a repository system by a broadband transmitter system, said broadband receiver receiving both identical data being distributed to a plurality of data display systems and unique data targeted to said display system;

a narrowband transceiver attuned to a narrow bandwidth channel and transmitting and receiving digital data exchanged with said repository system;

said broad bandwidth channel and said narrow bandwidth channel cooperating, through said receiver and said transceiver, for exchange between said display and repository systems of larger data files through said broadband channel and of smaller data files through said narrowband channel;

a processor, memory operatively connected with said processor, and a data selection program stored in said memory accessibly to said processor, said program and said processor cooperating, upon execution of said program by said processor, in selecting from said data stream as received by said broadband receiver data files having content determined by said program.

* * * * *